Figure 1:
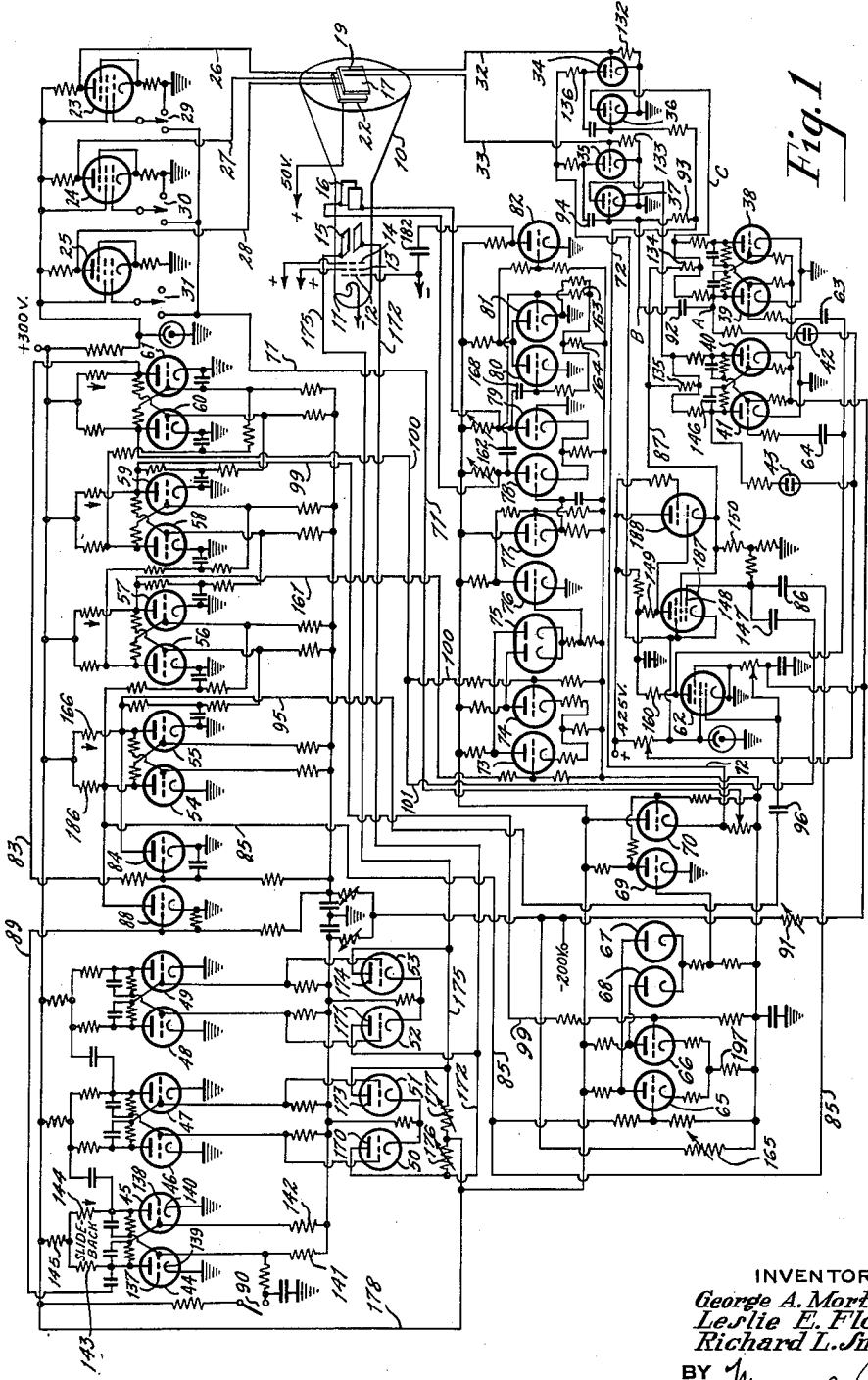

Nov. 10, 1953  G. A. MORTON ET AL  2,658,670
RATE DETERMINING DEVICE
Filed Aug. 31, 1949  2 Sheets-Sheet 1

INVENTORS
George A. Morton,
Leslie E. Flory &
Richard L. Snyder, Jr.
BY
ATTORNEY Nov. 10, 1953   G. A. MORTON ET AL   2,658,670
RATE DETERMINING DEVICE
Filed Aug. 31, 1949   2 Sheets-Sheet 2

INVENTORS
George A. Morton,
Leslie E. Flory &
Richard L. Snyder, Jr.
BY
ATTORNEY Patented Nov. 10, 1953

2,658,670

UNITED STATES PATENT OFFICE 2,658,670

RATE DETERMINING DEVICE

George A. Morton and Leslie E. Flory, Princeton, and Richard L. Snyder, Jr., Glassboro, N. J., assignors to Radio Corporation of America, a corporation of Delaware Application August 31, 1949, Serial No. 113,358

17 Claims. (Cl. 235—61)

1

This invention relates to rate determining devices such as are utilized to determine the velocity of aircraft or other moving bodies, and has for its principal object the provision of an improved apparatus and method of operation whereby the rate at which an object is moving may be repeatedly determined at successive and relatively short intervals of time. The present application is a continuation in part of my copending application Serial No. 502,162, filed September 13, 1943, for "Rate Determining Devices," which has been abandoned.

In connection with anti-aircraft gun fire control, for example, the problem of determining the target velocity components with as high a degree of accuracy as possible is of fundamental importance. In accordance with the present invention, this result is achieved by observing the position of the object at the ends of known time intervals and taking the difference between the observations divided by the time interval as the velocity for the interval selected. Where the velocity of the object is subject to change, frequency determination of the rates must be obtained. In case the accuracy of the input data is low, the rate averaging time must be relatively long. The time intervals are therefore chosen so that they overlap.

In the illustrated embodiment of the present invention, there are utilized a number of overlapping intervals, and the rate is determined by comparing the first observation to a later observation, etc.

This procedure requires that each observation be recorded and stored while successive observations are made and be then subtracted from the later observation to obtain the difference, which is divided by the time interval to derive the rate for that particular interval. The position of the object is represented by a number which is proportional to the distance of the moving object from a plane of reference. The disclosed embodiment of the invention is adapted to store eight such numbers. The ninth number is compared with the first and then stored in the place occupied by the first and the next comparison is between the second and tenth numbers.

Retention of the numbers is accomplished by means of a special storage cathode ray tube. The composite target of this tube is provided with input terminals through which potentials representing the various digits of a number are established in alignment across the target and with output terminals from which a number is delivered through amplifiers and carry-over tubes to a counter where it is stored until compared with the number appearing at the end of the interval. An electron beam is swept over the position of a number on the target both to record and to reproduce the number. The potential of the target

2 control electrodes determines whether the number is recorded or reproduced.

Movement of the electron beam of the storage tube into alignment with the different numbers stored in the target is effected by means of a trigger or sequencing circuit of the trigger circuit type, and movement of the beam from one to another digit of each number is effected by another similar trigger circuit combined with suitable delay networks which slow the motion of the beam. The cycle of operation is, to a large extent, controlled by an electronic switch made up of a plurality of electron discharge tubes so interconnected as to afford automatic operation of the device when stepping pulses are applied to the sequencing part of the apparatus and potentials representative of the different numbers are successively applied to the input terminals of the target.

The numbers stored in the target of the storage tube are based on the binary system of numeration. This system, as is well known, involves only the two digits 0 and 1. For any number, the first digital position (at the right) signifies whether there is a 1 or $2°$ in the number or not, the second digital place whether there is a 2 or $2^1$ or not, the third whether there is a 4 or $2^2$ or not, etc. In adding a column of binary numbers, a sum of 1 means that a 1 is to be placed in that column of the sum, a sum of 2 means that a 0 is to be placed in that column and a 1 is to be placed in the next highest column, a sum of 3 means that a 1 is to be placed in both columns, etc.

Subtraction in the binary system may be accomplished as easily as addition. Thus, by ordinary subtraction, the operation of finding the difference between two numbers A and B is performed as follows:

$$A = 110101100$$
$$B = \phantom{0}10111011$$
$$A - B = \phantom{0}11110001$$

The difference between these two numbers A and B may also be derived by a somewhat different procedure which involves inverting the number A, adding and reinverting the sum as indicated by the following operation:

$$A = 110101100$$
$$A \text{ inverted} = 001010011$$
$$B = \phantom{0}10111011$$

$$A \text{ inverted} + B = 100001110$$
$$\text{Reinverted} = 011110001$$

The latter method of subtracting binary numbers by inverting the minuend, adding and reinverting the sum, is followed in the rate determining device specifically disclosed herein. This procedure has the advantage that it results in certain simplifications of the apparatus.

Among the further objects of the invention are the provision of a rate determining device which functions automatically and continuously to determine the velocity of a moving body at relatively short successive intervals of time; the provision of an improved rate determining apparatus which is capable of storing a plurality of different numbers representative of the position of an object at successive instants of time and the provision of means for determining the difference between numbers representative of the position at the beginning and end of a particular time interval, which difference, when divided by a number representing time, shows the velocity of the object.

The invention will be better understood from the following description considered in connection with the accompanying drawings, and its scope is indicated by the appended claims.

Referring to the various figures of the drawings:

Figure 1 is a wiring diagram of the improved rate determining device, and

Figure 2A:
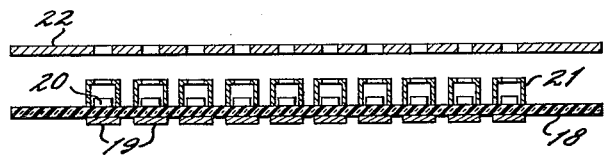
Figure 2B:
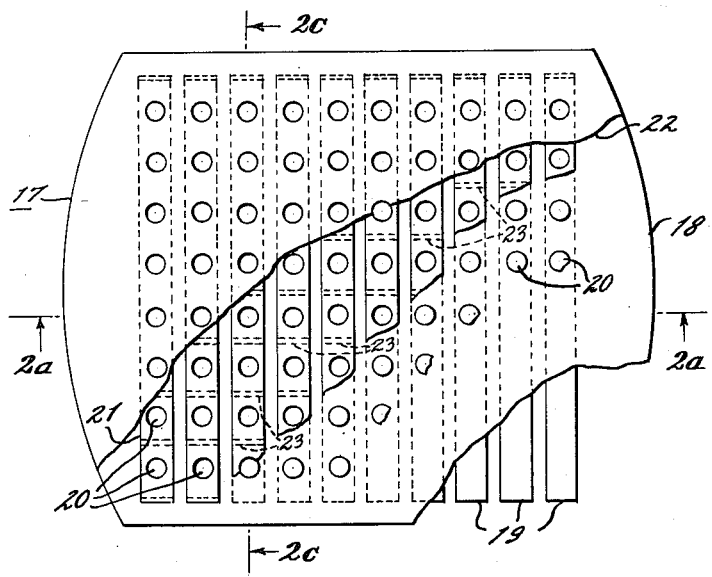
Figure 2C:
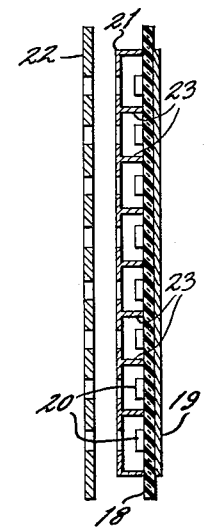

Figs. 2a, 2b, and 2c are different views illustrating the structural details of the storage tube target in which the numbers are stored.

An important element of the rate determining apparatus of Fig. 1 is a cathode ray tube 10 which includes a cathode 11, a beam control electrode 12, first and second anodes 13 and 14, vertical deflecting electrodes 15, horizontal deflecting electrodes 16, and a composite target 17.

The constructional details of the number storage target 17 are shown in Figs. 2a, 2b and 2c. It includes a mica sheet 18 about .003" inches thick. Ten vertical metallized (silver) strips 19 are mounted on the back (the side away from the electron beam) of this sheet. Each strip 19 is provided with an output lead 32, 33 etc., and corresponds to a position in the binary number system. On the front of the mica sheet 18 are ten columns of eight metallized discs 20 or secondary electron emissive surfaces, each column being opposite to a different one of the output strips 19. Over each column of the discs 20 is a metal trough 21 provided with a series of apertures which register with the discs underlying the trough, and with a series of partitions 23 which divide the trough 21 into a series of boxes or compartments each of which encloses a disc. These troughs are each provided with an input lead 26, 27, 28, etc. corresponding to a position in the binary system. The front member of the target is a metal sheet or screen 22 perforated with 80 apertures which are in register with the 80 discs 20. The columns of discs are also aligned so that the discs form parallel rows of discs as well.

The electron beam formed by the gun 11—13—14 is made to sweep any desired horizontal row of discs 20 by an electronic switching system which controls the potentials of the vertical and horizontal deflection electrodes 15 and 16, as hereinafter described.

The discs 20 are provided with secondary electron emissive surfaces so that any one of the discs struck by the beam will assume a potential such that the net current to it is zero. Otherwise stated, the disc will be driven to approximately the potential of the trough over it so that the number of secondary electrons it emits equals the number of electrons it receives through the beam.

Potentials representative of a binary number are applied from a plurality of input transfer tubes 23, 24, 25, etc. through input leads 26, 27, 28, etc. to the troughs of the storage target 17. Only three of these input transfer tubes and input leads have been shown in Fig. 1 in order to simplify the drawing. It should be understood, however, that the number of input transfer tubes and leads corresponds to the number of target troughs 21, namely, ten in the particular target under consideration. It should also be remembered that each input transfer tube, together with its corresponding lead and trough, represents a different digital position of a binary number.

Suppose now that the beam is at the right hand side of the target as it appears drawn in Fig. 2b, and it is desired to record a ten place binary number in the uppermost row of the discs 20. This is accomplished by making the troughs 21 positive by 150 volts for every digital position where there is a 1 in the number and allowing the remaining troughs to remain at their normal potential of 50 volts where there is a 0, and the screen 22 being maintained at a potential near that of such normal potential. This change in the voltage of the troughs 21 is effected by the switches or keys 29, 30, 31, etc., or any other suitable means connected in the grid circuits of the input transfer tubes 23, 24, 25, etc., each trough being charged to a potential of 150 volts when the corresponding switch is closed to the left, and to its normal voltage of 50 volts when this switch is closed to the right. When the switches 29, 30 and 31 are in their left-hand closed position, potential is applied to the first grids of the tubes 23, 24 and 25 through a lead 71. As hereinafter explained, this lead has its potential determined by the voltage drop across the cathode lead resistor of a tube 70. With the trigger circuits 54—55, 56—57, 58—59 and 60—61 conducting current as indicated by arrows adjacent their anode resistors, the potential of the lead 71 is such as to maintain the leads 26, 27, and 28 at +150 volts. Under certain other current conductive conditions of the trigger circuits 54—55 to 60—61, the potential of the lead 71 is made sufficiently positive to reduce the potential of the leads 26, 27 and 28 to +50 volts.

Under these conditions, the beam is moved to the left along this uppermost or first row of discs, causing these discs, due to their secondary electron emission, to assume potentials corresponding to those of the corresponding troughs. Once the discs are charged, they retain their charge until the beam is passed over them again. Thus the first binary number is now stored in the target. By moving the beam into registry with the successive rows of discs, additional binary numbers are stored in the target in a similar manner.

Any one of these numbers is removed from the target by holding the troughs at 50 volts and moving the beam across the row representing the selected number. When this is done, the discs which were charged to 150 volts lose their charge and return to their normal +50 volt potential. This change in the charge of the discs induces corresponding changes in the potentials of the strips 19 behind the discs and, as a consequence, current flows in the output leads 32, 33, etc. The troughs 21 may therefore be considered as the storage target input members and the strips 19 may be considered as the storage target output members. The currents in the output leads 32, 33 etc. are applied to resistors 132 and 133 connected in the input circuits of amplifiers 34, 35, etc., which are connected through transfer or carry-over tubes 36 and 37 to a register which is of the trigger circuit type and includes the triodes 38—39, 40—41, etc. Since the currents of the leads 32 and 33 are produced as a result of the discharge of the capacitors formed by the discs 20 and strips 19 (see Fig. 1), these currents flow through the resistors 132 and 133 in such a direction as to make the grids of the tubes 34 and 35 more negative. Thus, the first counting pulse on the lead 32 makes the grid of the tube 34 more negative, less current is drawn through the resistor 136, a more positive potential is applied to the grid of the tube 36 and the tube 36 draws more current through the common anode resistor 134 of the register stage 38—39 thereby producing a negative pulse at the common anode resistor terminal of this stage and causing conduction to be transferred from the tube 38 (binary 0) to the tube 39 (binary 1).

As elsewhere explained, operating potential is applied to the anodes of the tubes 36 to 41 from a "+425" lead through a tube 188 which has a resistor 150 connected in its cathode lead and has its cathode connected to the various anodes through means including a lead 87.

The second counting pulse on the lead 32 functions in the same way to produce at the common anode connection of the counter stage 38—39 a negative pulse whereby current conduction is transferred from the tube 39 (binary 1) to the tube 38 (binary 0). When this occurs, the potential at the point A becomes more positive, a positive pulse is applied through the capacitor 92 to the grid of the tube 37, this tube draws more current through the common anode resistor 135 of the register stage 40—41 and current conduction is transferred from the tube 40 (binary 0) to the tube 41 (binary 1).

In this connection, it should be understood that the grid of the tube 37 is isolated from the grid of the tube 36 by the resistor 93 and that the positive pulse transmitted through the capacitor 92 is therefore ineffective to change the conductive condition of the tube 36. It is also apparent that the tube 36 functions merely as a pulse transfer tube since there is nothing to be carried over into the first counter stage 38—39.

Counting pulses applied to the lead 33 function in the same way as those applied to the lead 32 to effect entries in the register stage 40—41.

It is apparent that carry over pulses transmitted between the different register stages 38—39, 40—41 etc. cannot occur at the same time as the counting pulses because the counting pulses are spaced in time and the carry over pulses occur only after the register stages have responded to the counting pulses.

Each pair of these tubes 38—39, 40—41, etc. represents a digital position of a binary number, each 1 being indicated by the lighting of a lamp 42, 43, etc. and each 0 being indicated by an unlighted condition of the corresponding lamp.

It is apparent that a number is stored in the target in the form of charges on condensers formed by the discs 20 and output strips 19. After a number has been so recorded, it is not disturbed, by changing the potentials of the troughs, until it is again scanned by the beam. Of course, after a long period of time, the charges are dissipated by leakage, but this is a matter of minutes or even hours. It has been found advisable, however, to bias off the beam, except during its scanning periods, in order to avoid loss of charge due to scattered electrons.

An understanding of the various functions performed by the circuit control part of the apparatus is facilitated by considering the cycle of operation by which the first observation is compared to the ninth, the second to the tenth, etc. For each of these comparisons, the following operations are performed:

1. The beam deflecting voltages are so adjusted as to direct the beam to the row of condensers 19—20 in which the oldest number is stored.
2. An impulse clears the register 38—39, 40—41, etc. to zero.
3. The input transfer tubes 23, 24, 25, etc. are turned off and the amplifier tubes 34, 35, etc., the carry-over tubes 36, 37, etc. and the register tubes 38—39, 40—41, etc. are turned on.
4. The beam is deflected across the row of discs containing the oldest stored number, transferring this number to the register as indicated by the lamps 42, 43, etc. (The beam is always turned on at the beginning and turned off at the end of a deflection.)
5. The input tubes 24, 25, etc. are switched on and the register carry-over tubes 36, 37, etc. are turned off.
6. The register 38–39, 40–41, etc. is inverted.
7. The present number is swept into the position of the old number by deflecting the electron beam.
8. The input tubes 24, 25, etc. are turned off and the register carry-over tubes 36, 37, etc. are turned on.
9. The new number is swept into the register by deflection of the electron beam.
10. The carry-over tubes 36, 37, etc. are turned off and the input tubes 24, 25, etc. are turned on.
11. The present number is replaced in the target by deflecting the electron beam.
12. The register is inverted.

At the beginning of this rate taking operation, the target 17 is filled with eight binary numbers representing values $Xa$, $Xb$...$Xh$ of a variable X (the position of a moving body, for example) taken at intervals $\tau$ and stored from the top to the bottom of the target in the order $Xa$, $Xb$...$Xh$.

Sated in terms of effects instead of terms of switching operations, the operation is as follows:

The next number $Xi$ appears in the input tubes.
The number $Xa$ is swept into the register.
The number $Xi$ is swept into the first row of the target.
The register is inverted.
The number $Xi$ is swept into the register.
The number $Xi$ is stored on the first row of the target.
The output register is inverted.

The output register now contains the desired quantity $Xa-Xi$ which is divided by $8\tau$ to derive the rate (the values of $\tau$ may be so adjusted that this division is performed merely by moving the binal point). The target now contains values of X from $Xb$ to $Xi$. This completes the cycle of operation and the apparatus is now in condition to start the next successive cycle in response to a timed stepping impulse applied through any suitable means illustrated as a key 90.

It should be noted that at this point the switching system by which these various steps of the cycle are produced has only one stable condition (the cycle starting condition) to which it always returns. This is to prevent an accumulative confusion in case of a temporary interruption of the cycle.

Since similar (not identical) trigger circuit chains 44—45, 46—47, 48—49 and 54—55, 56—57, 58—59 are utilized to control the switching sequence, and the register 38—39, 40—41, etc. is also a trigger circuit chain, it is desirable to understand the operation of such trigger circuit chains before the various switching operations are considered in detail.

In its simplest form, the trigger circuit includes two triodes, such as the tubes 44—45 of Fig. 1, in which the grid 137 of the first triode is coupled to the anode of the second triode through a coupling resistor (shunted by a capacitor in some cases) and the grid 138 of the second tube is connected to the anode of the first tube through a similar resistor. The cathodes 139 and 140 of both triodes are grounded. Grid bias potentials are applied through resistors 141 and 142 and anode potentials are applied through separate resistors 143 and 144, a resistor 145 being common to both anodes.

As indicated above, the various trigger circuits involved in the present apparatus are similar but not identical. Thus the trigger circuits 38—39, 40—41, 46—47, 48—49, 54—55, 56—57, 58—59 and 60—61 are of the type which have grid resistors of equal value and are stable with current conduction in either triode of the circuit. The trigger circuit 44—45 has grid resistors of unequal value so that it is stable only with current conduction in the triode 45, as indicated by the arrow. Otherwise stated, the trigger circuits 38—39, 40—41, 46—47, 48—49, 54—55, 56—57, 58—59 and 60—61 are of the double stability type and the trigger circuit 44—45 is of the single stability or slideback type. In the operation of a double stability type trigger circuit wherein the first tube is conducting current, the application of a negative impulse to the grid of the first tube reduces the anode current of this tube making its anode potential more positive. Due to the coupling resistor connection, the grid of the second tube becomes more positive, causing an increase in the anode current of this tube and a decrease in its anode potential, thereby making the grid of the first tube still more negative. This action continues until the anode current of the first tube is cut off.

In the use of the double stability type of trigger circuit, the first tube remains off and the second tube conducts anode current until a positive potential is applied to the grid of the first tube or a negative potential is applied to the grid of the second tube. In either case, the tube operating conditions are reversed so that the first tube conducts and the second tube is cut off.

In the operation of a slideback trigger circuit, current conduction is similarly transferred from one to the other triode of the trigger circuit but automatically returns to the normally conducting triode after a time interval determined by the relation between the grid resistor and condenser values of the trigger circuit.

The trigger circuit chains of Fig. 1 involve the use of such trigger circuits connected in cascade. In this arrangement, a predetermined change in the polarization of one triode of a pair generates a pulse to trigger or activate the corresponding triode of a succeeding pair.

An important element of the system of Fig. 1 is the register unit 38—39. This is a trigger circuit having two stable states corresponding to the digits 0 and 1, respectively, so arranged that an input pulse causes them to change from one to the other. It has a primary output point A from which an indication of the stable state of the register is derived, and a secondary output point B to which is transmitted a negative impulse when the register changes from 0 to 1, and a positive impulse when the change is from 1 to 0.

This trigger circuit consists of the two vacuum tubes 38 and 39, with the grid of each connected through resistors and condensers to the plate of the other. Each tube has a plate resistor and a grid resistor. The upper terminals of the plate resistors are connected through a common resistor 134, a lead 87 and a tube 188 to a positive voltage supply indicated as 425 v. With these connections, it is evident that the anode potentials of the tubes 36 to 41 is determined by the voltage drop of the cathode resistor 150 of the tube 188. The bias voltage of the tubes 38 to 41 is so adjusted by a variable resistor 91 as to fulfill two conditions. The first is that if the tube 38 is conducting, there will be a negative voltage on the grid of the tube 39 and this tube will be biased off. The second is that if the tube 38 is biased off a positive voltage is applied to the grid of tube 39 and this tube is conducting. Since the tubes are symmetrically connected, a similar set of conditions is met by the grid voltage of tube 38. It is therefore apparent that there are two stable conditions for such a trigger circuit unit, one with the tube 38 conducting and the tube 39 cut off, and the other with the tube 38 cut off and 39 conducting. These are the two states corresponding to the binary digits 0 and 1. What has been said with respect to the unit 38—39 is also true of the other register units except 44—45.

A negative impulse applied at the input point C will cause the trigger circuit to turn over, i. e., to change from one state to another. This turn-over is effected by virtue of the dissymmetry introduced through the difference in the stored charges on the two grid condensers. A positive impulse at the point C does not cause the trigger circuit to turn over.

At the secondary output point B, a negative impulse is produced when the tube 39 changes from the non-conducting to the conducting state. This impulse is obtained by differentiating the sudden decrease in the plate voltage by means of the condenser-resistance filter 92—93. There is also a positive pulse at this point resulting from a change of state in the opposite sense. Either one of these pulses at the secondary output point B may be used for the carry along pulse, since only one pulse of each type is produced for every two input pulses.

A set of representative circuit constants for such multivibrators is listed in the following tabulation:

Common and individual plate resistors=5000 ohms
All four grid resistors=50,000 ohms
Grid condensers=100 mmf.
Carry over differentiating resistor=5000 ohms
Carry over differentiating capacitor=40 mf.

A trigger circuit having these constants responds to impulses up to a rate of 200,000 per second. The input pulse duration should be approximately 1 microsecond irrespective of the rate of occurrence.

If a chain of these trigger circuit units is formed by connecting the secondary output point B of one directly to the input of the next succeeding unit, omitting the carryover stage 37, the chain will constitute a binary counter for impulses applied to the input point C of the first unit. Thus the first impulse causes the No. 1 trigger circuit to change from 0 to 1 and a positive pulse is generated at the secondary output point, but the No. 2 trigger circuit does not change state or turn over because it is insensitive to a positive pulse. The second pulse changes No. 1 from 1 to 0, producing a negative impulse at the secondary output point and changing No. 2 from 0 to 1. The third pulse changes only No. 1. The fourth pulse changes No. 1 from 1 to 0, No. 2 from 1 to 0 and No. 3 from 0 to 1. This continues in this manner for the entire chain.

So far the trigger circuit chain has been considered as an impulse counter. As such, it functions as an adding device and a memory system.

If, instead of applying impulses only to the input lead of the No. 1 trigger circuit, leads are brought out from every trigger circuit and each lead is made to represent a place in the binary system, the counter will record or register, sum, and memorize binary numbers introduced on these leads, provided the carry-over pulse causes the next successive trigger circuit to change state. A difficulty arises, however, from the fact that the input pulse and the carry-over pulse may reach the same input point simultaneously and, instead of causing the trigger circuit unit to change state twice, as it should, it will cause it to change only once. This difficulty may be avoided by delaying the carry-over pulse long enough to permit a change of state by the direct pulse to be completed before the carry-over pulse arrives.

In this device confusion between input and carry-over pulses is mainly avoided by spacing the input pulses in time and by making the first input pulse that of the highest digit, the second that of the next to the highest digit, etc. In this way no carry-over pulse can occur until the input pulse for the particular tube receiving the carry-over pulse has been impressed and the system has been stabilized.

The timing and order of the input pulses is very simply accomplished by sweeping the scanning beam across the stored numbers from the digit of the highest power of 2 to the digit of lowest power of 2. Since order makes no difference when a number is being stored, the beam can move in the opposite direction during the storage operation.

This delay of the carry-over pulses may be effected in several ways. In the system illustrated by Fig. 1, it is accomplished by connecting the secondary output point B of the first trigger circuit 38—39 to the grid of the carry-over tube 37 and coupling this grid through a capacitor 94 to the anode of the amplifier 35 which is controlled by the direct impulse. This same connection is, of course, repeated for successive units of the trigger circuit. As previously explained, the grid of the tube 36 is isolated from the capacitor 92 by the resistor 93 and is not affected by the carry-over pulse.

Subtraction in the binary system may be performed as easily as addition. When the digit 1 is taken from any position in the counter, this position must change to 1 if it was initially at 0 or to 0 if it was initially at 1, just as in addition. When it changes from 0 to 1, one digit must be "borrowed from" (which is the same as "carried to") the next successive place. In terms of the register chain, this means that the filter 92—93 of the secondary output point could be connected to the opposite side of the trigger circuit so that the carry-over is for a change of state 0 to 1 instead of 1 to 0. This, however, is instead accomplished by inverting the counter with the minuend in it, adding the subtrahend to the inverted minuend, and inverting the result.

As hereinafter explained, the counter 38—39, 40—41, etc. is inverted in response to a positive pulse applied either through the lead 85 and the capacitor 86 or through a lead 100, connecting lead 101 and a capacitor 147 to the grid 148 of the tube 187. A positive pulse applied to the grid 148 functions to increase the current drawn through the resistor 149, decrease the current drawn through the resistor 150 and to apply to the common anode connections of the counter units a more negative potential by which the current conducting condition of each unit is changed.

The cycling of the various required operations is accomplished by a rather complicated system which consists of one part which controls the deflection of the electron beam along the column to select the rows of numbers and another part which controls the deflection of the beam along the rows and performs various other control functions. Both these parts are set into operation by an impulse supplied from the trigger circuit unit 44—45. Means illustrated as a key 90 are utilized to excite this unit, but this is replaced in practice by an interval timing circuit for producing timed stepping pulses. Interval timing means are so old and well known that a detailed description of them would be superfluous. Any means capable of producing accurately timed positive pulses is suitable for the purpose.

Deflection along the column is controlled by the trigger circuit units 46—47, 48—49 and such additional links of the chain as are required to complete the scanning of the target. These units are connected as simple scale of two counters. The grids of the unit 46—47 are connected to the grids of a triode pair 50—51, the grids of the unit 48—49 are connected to the grids of a triode pair 52—53, and any additional units of the chain are similarly connected.

The first unit reverses on each impulse, the second on every other impulse, the third on every fourth impulse, etc. When a trigger circuit unit reverses, it shifts the current in the triode pair to which it is connected from one triode to the other. The current of these triodes is fixed by the cathode resistors to be in the ratio of 1, 2, 4, etc., the lowest current being caused by the tubes connected to the most frequently changing unit. The anode of half of a triode pair is connected to the corresponding anodes of the other triode pairs. Thus the anode 170 of the unit 50—51 is connected to the anode 171 of the unit 52—53 and through a lead 172 to one of the deflecting plates 15 of the tube 10. Likewise the anode 173 of the unit 50—51 is connected to the anode 174 of the unit 52—53 and through a lead 175 to the other of the deflecting plates 15 of the tube 10. When current conduction is transferred to tube 46 of the unit 46—47, the beam of the tube 10 is deflected to the first row $X_a$ of the target 17. When current conduction is transferred to the tube 48 of the unit 48—49, the beam is deflected to the $X_b$ row of the target 17, etc. These two groups of anodes are connected through the two adjustable resistors 176 and 177 and a lead 178 to the positive supply terminal indicated as +300 v.

The voltage across the deflecting plates 15 is proportional to the difference in current through the two adjustable resistors 176 and 177. When the counter is zero, the current difference is at one extreme, because the grids serving one group of plates are positive while the others are negative. The first pulse turns over the first trigger circuit and shifts the current from one side of the first triode pair (which carries the lowest current) to the other. The next impulse returns the first pair to its original condition and reverses the next pair, which carries twice the current. The third pulse turns the first pair over again and the process continues until the target is filled. The next pulse turns the register to zero, deflecting the beam to the starting position.

This process of filling the target is dependent on the fact, mentioned above, that the cathode resistors of the triode pairs 170—173, 171—174, etc. are such as to produce in the resistor 176 currents in the ratio of 1, 2, 4, etc. Thus, when current conduction is in the tubes 47 and 49 of the units 46—47, 48—49, etc., no current is drawn through the resistor 176, the maximum current is drawn through the resistor 177, the lower vertical deflector has its maximum positive potential and the upper vertical deflector has its maximum negative potential. When current conduction goes to the tube 46 of the unit 46—47, the tube 50 draws current through the resistor 176 thereby making the upper vertical deflector more positive, making the lower vertical deflector more negative and shifting the beam of the tube 10 vertically by a distance equal to that between the rows of the target. This sequence of operation is repeated as current conduction goes to the left-hand tube of each of the units 46—47, 48—49, etc.

The rate determining process, of course, cannot begin until all the rows of the target are full for the reason that, up to that time, there is no data to be compared with that swept into the target.

As will appear, the units 46—47, 48—49, etc. are advanced one step for each complete operating cycle of the units 54—55 to 60—61 which control the horizontal deflection of the beam of the tube 10. This follows from the fact that the units 54—55 to 60—61 are so interconnected that change in the current conductive condition of the unit 54—55 causes the following units 56—57, 58—59 and 60—61 to change their current conductive conditions one after the other.

Certain switching operations and deflection of the beam along the rows of the target are effected by the sequencing units 54—55, 56—57, 58—59, and 60—61 acting through the tubes 65—66, 67—68, 69—70, 73—74, 75, 76—77, 78—79, 80—81 and 82. The sequencing units are essentially trigger circuits in which the grid plate coupling condensers are omitted. A resistance-capacity network couples one plate of each pair of tubes to the complementary grid of the succeeding trigger circuit, so that, when the first unit 54—55 is turned over, the current in the coupling resistors causes the next to turn over, which then causes the third and thereafter the fourth to turn over. The condensers in this network delay the action between the units. When the last unit turns over in one direction, a resistance-capacity network causes the tripping tube 84 to turn back the first unit 54—55, to be followed by the succeeding units. This condition is stable because the final unit effects the first only when it is in one position. In order to start the cycle, an impulse is applied to the starting tube 88 through the lead 89 from the starting unit 44—45. The entire cycle takes about 0.2 second.

In the standby condition of the apparatus, current conduction is in the right hand triodes of the units 54—55 to 60—61 as indicated by the arrows. The complete operating cycle of these units involves (1) the transfer of current conduction from the right to the left anodes of the units 54—55 to 60—61 successively and (2) the transfer of current conduction from the left to the right hand triodes of these units successively so that the cycle always ends with current conduction in the right-hand anodes of the various units.

The cycle is started by the application of a positive pulse to the grid 137 of the tube 44. This pulse causes the transfer of current conduction from the tube 45 to the tube 44 from which it returns to the tube 45 after a time interval determined by the relation between the values of the resistors 141 and 142. When current conduction returns to the tube 45 a positive pulse is applied through a lead 89 to the grid of a start tube 88 which draws current through a resistor 186 thereby making the grid of the tube 55 more negative and transferring current conduction from the tube 55 to the tube 54.

When the tube 54 conducts current, the anode of the tube 54 becomes more negative and the anode of the tube 55 becomes more positive. The more positive anode potential of the tube 55 is applied through a lead 95 and a capacitor 96 to the control grid of the counter clearing tube 62 which draws more current through a resistor 160 and causes a negative pulse to be applied through the capacitors 63 and 64 to the left hand grids of the register stages 38—39, 40—41, etc., so that the register is established in a zero count condition.

The negative anode potential change of the tube 54 is applied through a lead 85 and a capacitor 86 to the grid 148 of a counter inverting tube 187. As a result, the grid 148 of the tube 187 is made more negative, the tube 187 draws less current through the resistor 149, the grid of the tube 188 becomes more positive, the tube 188 draws more current through the resistor 150 and a positive pulse is applied to the lead 87. This positive pulse does not affect the condition of the register.

The more negative anode potential of the tube 54 is also applied to the grid of a tube 65. The tube 65 and a tube 66 have a common cathode lead resistor 197. The grids of these tubes are so biased that both tubes conduct only when their grids are at the same potential. When one grid is more positive than the other, both cathodes become more positive because of the common cathode resistor so that the grid which is less positive is biased off. This is also true of tubes 73 and 74 which have the same type connection and function in connection with the horizontal scanning of the target as hereinafter explained.

As a result of the application of the more negative anode potential of the tube 54 to the grid of the tube 65, the grid of the tube 65 is at the same potential as the grid of the tube 66. The grid of tube 66 is connected through a lead 99 to the anode of the tube 59 which is also conducting current. Under these conditions, the anode potential of the tube 68, which is connected to the anode of tube 66, is made more negative, less current is drawn through the common anode resistor of the tubes 67 and 68, the grid of the tube 69 becomes more negative, the grid of the tube 70 becomes more positive, more current is drawn through the cathode resistor of the tube 70 and the leads 71 and 72 are made more positive.

The more positive potential of the lead 71 is applied to the grids of such of the tubes 23, 24, 25, etc., as are in a binary 1 condition and causes these tubes to draw through their anode lead resistors sufficient current to reduce the potential of the leads 26, 27, 28, etc., to about the same value as when the switches 29, 30, 31, etc., are closed to the right.

The more positive potential of the lead 72 is applied to the grids of the carry over and transfer tubes 36 and 37 so that these tubes may be made to conduct in response to counting pulses applied through the leads 32, 33, etc. As previously indicated, the tube 36 functions merely as a transfer tube since there is nothing to be carried over into the register stage 38—39.

Up to this point, a zero count has been established in the register, the grid bias potential of the tubes 36 and 37 has been changed to a value such that these tubes can respond to the counting pulses applied to the leads 32 and 33, and the beam of the tube 10 has been deflected into alignment with the first row of the target 17 so that conditions are such as to permit sweeping the first stored number into the register. This happens when current conduction goes from the tube 57 to the tube 56 in response to the more negative potential applied to the grid of the tube 57 from the anode of the tube 54 which is now conducting current.

When current conduction goes from the tube 57 to the tube 56, the anode of the tube 56 has a more negative potential and the anode of the tube 57 has a more positive potential. The more positive anode potential of the tube 57 is applied through a lead 161 to the grid of a tube 73 which has a cathode resistor in common with a tube 74. Since the grid of tube 74 is connected through a lead 100 to the anode of the tube 60, which also is not conducting current, the grids of the tubes 73 and 74 are at the same potential. Under these conditions, less current is drawn through the cathode lead resistor of the tube 75, a more negative potential is applied to the grid of a tube 76, less current is drawn through the anode resistor of the tube 76, the grid of a tube 77 is made more positive, more current is drawn through the cathode lead resistor of the tube 77 and a more positive potential is applied to the grid of a tube 78.

It will be noted that potential is applied to the horizontal deflectors 16 of the tube 10 from the anodes of the tubes 78 and 79. The tubes 78 and 79 have anode lead resistors which are adjustable and a common cathode lead resistor. Prior to the application of the more positive potential from the cathode of the tube 77 to the grid of the tube 78, the conditions are such that the beam of the tube 10 would be directed to a point near the end of the first horizontal row of the target 17. When such more positive potential is applied to the grid of the tube 78, however, the deflector 16 connected to the anode 78 is made more negative, the beam is swept over the first row of the target and the number $X_a$ is swept into the register.

When the anode potential of the tube 78 becomes more negative, a negative pulse is applied through a capacitor 162 to the grid of a tube 81 which has its cathode grounded. When the grid of tube 78 becomes more positive more current is drawn through the common cathode resistor of tubes 78 and 79, thus making the cathode of tube 79 more positive. This causes less current to flow through the anode resistor of tube 79 and the anode of tube 79 becomes more positive. The grid of the tube 80 is connected to the anode of tube 79 through the condenser 168. The tube 81 and the tube 80 have a common anode lead resistor and a common grid resistor which is returned to −200 v. The value of this common grid resistor is such that tubes 80 and 81 are both normally cut off. With these connections the negative pulse applied to the grid of tube 81 from the anode of tube 78 causes no change in the conduction of tube 81. The positive pulse impressed on the grid of tube 80 by the anode of tube 79, however, causes tube 81 to conduct and a negative pulse is produced in the common anode resistor of the tubes 80 and 81. The circuit arrangement involving tubes 78, 79, 80 and 81 is such that a negative pulse appears at the common anode lead of tubes 80 and 81 for either a positive or negative excursion of the grid of tube 78. Under these conditions the negative pulse applied to the grid of tube 82 produces at the anode of tube 82 a positive pulse which is applied through a capacitor 182 to the grid 12 of the tube 10 and functions to bias on the beam of this tube at the start of the movement of the beam from right to left (as viewed from the small end of the tube 10) and for a time interval equal to the duration of such movement. This time interval, of course, is very short.

When current conduction goes from the tube 57 to the tube 56, as previously indicated, a more negative potential is applied to the grid of the tube 59 and current conduction is transferred from the tube 59 to the tube 58. The resulting more positive anode potential of the tube 59 is applied through a lead 99 to the grid of the tube 66. The grid of the tube 65, however, is still at a potential determined by the anode potential of the tube 54 which is conducting current. As a result, more current is drawn through the common cathode resistor of the tubes 67 and 68, the tube 69 takes more current, the tube 70 takes less current, the potential of the lead 72 becomes sufficiently negative to bias off the tube 36 and 37 and the lead 71 becomes sufficiently negative to produce in the anode lead resistors of the tubes 23, 24 and 25 a voltage drop such that the leads 26, 27 and 28 are maintained at a potential of +150 volts.

When current conduction goes from the tube 59 to the tube 58, as previously indicated, a more negative potential is applied to the grid of the tube 61 and current conduction goes from the tube 61 to the tube 60. As a result a lead 83, connected to the anode of tube 61, is made more positive and a lead 100, connected to the anode of tube 60, is made more negative.

The more negative potential of the lead 100 is simultaneously applied to a lead 101 and also to the grid of the tube 74.

The more negative potential of the lead 101 is applied through a capacitor 147 to the grid 148 of the counter inverting tube 187. As a result, the tube 187 draws less current through its anode resistor 149, the grid of the tube 188 becomes more positive, more current is drawn through the resistor 150 and there is produced at the lead 87 a positive pulse which does not affect the condition of the counter.

Since the grid of the tube 73 is now at the anode potential of the tube 57 which is not conducting and the grid of the tube 74 is at the anode potential of the tube 60 which is conducting, more current is drawn through the common cathode lead of the twin diodes of the tube 75, the grid of the tube 76 becomes more positive, the grid of the tubes 77 and 78 become more negative, less current is drawn through the anode resistor of tube 78, a more positive potential is applied through the capacitor 162 to the grid of the tube 81, and a more negative potential is applied to the grid of the tube 82 so that its anode becomes more positive.

The more positive anode potential of the tube 82 produces at the grid 12 of the tube 10 a more positive pulse which permits the beam of the tube 10 to reach the target 17.

The more negative anode potential of the tube 78 is applied to one of the horizontal deflection plates 16 of the tube 10 and functions to move the beam across the target 17 from right to left (as viewed from the small end of the tube 10) sweeping the new number $X_1$ into the target. This return movement of the beam is relatively slow due to the capacitor 162 which is connected between the anode of the tube 78 and the —200 volt terminal through the resistors 163, 164 and 165.

The more positive potential of the lead 83 is applied to the grid of a tube 84 which draws more current through a resistor 166 and makes the grid of the tube 54 more negative so that current conduction is transferred from the tube 54 to the tube 55. This results in a more positive potential at the anode of the tube 54 and a more negative potential at the anode of the tube 55.

The more negative anode potential of the tube 55 is applied through the lead 95 and the capacitor 96 to the grid of the counter clearing tube 62. Since the grid of the tube 62 is already negatively biased by reason of its connection to the —200 v. terminal through the resistor 91, the negative potential of the lead 95 has no effect on the current conductive condition of the register clearing tube 62.

The more positive anode potential of the tube 54 is applied through the lead 85 to the grid of the tube 65 and through the lead 85 and the capacitor 86 to the grid 148 of the register inverting tube 187.

The positive pulse thus produced at the grid 148 of the tube 187 causes the tube 187 to draw more current through its anode lead resistor 149 thus making the grid of the tube 188 more negative, reducing the current of the tube 188 and applying through the lead 87 a negative pulse by which all the register stages are inverted.

The more positive anode potential of the tube 54 which is now applied to the grid of the tube 65 is the same as the more positive anode potential of the tube 59 which is now applied to the grid of the tube 66. Under these conditions, less current is drawn through the common cathode lead resistor of the tubes 67 and 68, less current is drawn through the tube 69, more current is drawn through the tube 70, the lead 71 is made sufficiently positive to produce +50 volts at the leads 26, 27 and 28, and the lead 72 is made sufficiently positive to bias the grids of the tubes 36 and 37 to a potential such that they can respond to the pulses applied through the leads 32, 33, etc.

The more positive anode potential of the tube 54 is applied to the grid of the tube 57 and causes current conduction to be transferred from the tube 56 to the tube 57 thereby producing a more positive potential at the anode of the tube 56 and a more negative potential at the anode of the tube 57.

The more negative anode potential of the tube 57 is applied through the lead 151 to the grid of the tube 73. The grid of the tube 74 is at the more negative anode potential of the tube 60. Under these conditions, more current is drawn through the tubes 75 and 76, less current is drawn through the tubes 77 and 78, more current is drawn through the tube 81 and less current is drawn through the tube 82. Decrease in the current of the tube 82 produces at the grid 12 of the tube 10 a positive pulse which permits the beam to reach the target 17 for a short time interval. Decrease in the current of the tube 78 produces at the horizontal deflector 16 a positive potential by which the beam is moved to sweep the number $X_1$ into the register.

The more positive anode potential of the tube 58 is applied to the grid of the tube 59. As a result, current-conduction is transferred to the tube 59, the anode of tube 59 becomes more negative and the anode of the tube 58 becomes more positive.

The more negative anode potential of the tube 59 is applied through the lead 99 to the grid of the tube 66. The grid of the tube 65 is at the more positive anode potential of the tube 54. Under these conditions, more current is drawn through the common cathode lead resistor of the tubes 67 and 68 and through the anode lead resistor of the tube 69, the current of the tube 70 is reduced, the lead 72 has its potential reduced to a value such that the tubes 36 and 37 are biased off, and the lead 71 has its potential reduced to a value such that the potential of the leads 26, 27 and 28 is +150 volts.

The more positive anode potential of the tube 53 is applied to the grid of the tube 61 thereby causing the current conduction to be transferred from the tube 60 to the tube 61, producing a more positive potential at the anode of the tube 60 and producing a more negative potential at the anode of the tube 61.

The more negative anode potential of the tube 61 is applied through the lead 83 to the grid of the tube 84 thus reducing the current which is drawn by it through the resistor 166. This reduction in current, however, has no effect on the current conductive condition of the trigger circuit 54—55 for the reason that the tube 55 is now conducting and the grid of the tube 54 is maintained at the more negative anode potential of the tube 55. Therefore, the trigger circuits 54—55 to 60—61 are stable in their standby condition with current conduction as indicated by the arrows.

The more positive anode potential of the tube 66 is applied (1) through the lead 100 to the grid of the tube 74 and (2) through the leads 100 and 101 and the capacitor 147 to the grid 148 of the register inverting tube 187.

The more positive potential thus applied to the grid 148 of the tube 187 causes more current to be drawn through the anode resistor 149 of the tube 187 thus making the grid of the tube 188 more negative. As a result, the tube 188 draws less current through its cathode resistor 150 and a negative potential is applied to the lead 87. This negative potential functions to invert the register so that there is now stored in the register the sum $X_a - X_1$. As previously indicated, the rate is determined either (1) by moving the binal point of the sum or (2) by dividing the sum by the time interval between the taking of the positions $X_a$ and $X_i$ of the moving object.

The grid of the tube 74 is now at the more positive anode potential of the tube 69 while the grid of the tube 73 is at the more negative anode potential of the tube 57. Under these conditions, (1) more current is drawn through the common anode lead resistor of the twin diodes 75 and through the anode lead resistor of the tube 76, (2) less current is drawn through the cathode lead resistor of the tube 77 and through the anode lead resistor of the tube 78, (3) more current is drawn through the anode lead resistor of the tube 81 and (4) less current is drawn through the anode lead resistor of the tube 82. Thus there is produced a more positive potential at the anodes of the tubes 82 and 78.

The more positive anode potential of the tube 78 is applied to the horizontal deflector 16 of the tube 10 so that its beam starts to sweep the number $X_i$ back into the first row of the target 17.

The more positive anode potential of the tube 82 produces at the grid 12 of the tube 10 a positive pulse which permits the beam to reach the target 17 as it is moved over the first row of the target.

The apparatus is now in a stable condition and prepared to start a new cycle in response to an impulse applied through key 90.

The disclosed rate taking apparatus is thus characterized by a cathode ray tube in which successive values of a variable are stored, by a switching system which functions to compare these values at certain predetermined intervals of time and by means for indicating or otherwise utilizing the result of such comparison.

What is claimed is:

1. The combination of means for forming a beam of electrons, pairs of electrodes for controlling the position of said beam, a plurality of secondary electron emissive elements aligned in columns and rows, a plurality of input members extending transversely of said rows and having apertures at said elements, a plurality of output members extending transversely of said rows and capacitatively associated with said elements, input means operable to apply to said input members successive sets of potentials, and means for applying to said electrode pairs potentials whereby said beam is moved to establish said successive sets of potentials on successive rows of said elements.

2. The combination of means for forming a beam of electrons, pairs of electrodes for controlling the position of said beam, a plurality of secondary electron emissive elements aligned in columns and rows, a plurality of input members extending transversely of said rows and having apertures at said elements, a plurality of output members extending transversely of said rows and capacitatively associated with said elements, input means operable to apply to said input members successive sets of potentials, means for applying to said input means a control potential such that said input means is made to apply the same potential to all of said input members, and means for applying to said electrode pairs potentials such that said beam is moved to establish said successive sets of potentials on successive rows of said elements only when said control potential is not applied to said input means.

3. The combination of means for forming a beam of electrons, pairs of electrodes for controlling the position of said beam, a plurality of secondary electron emissive elements aligned in columns and rows, a plurality of input members extending transversely of said rows and having apertures at said elements, a plurality of output members extending transversely of said rows and capacitatively associated with said elements, input means operable to apply to said input members successive sets of potentials each of which potentials has a relatively high or a relatively low value, means for applying to said input means a control potential such that said input means is made to apply the same potential to all of said input members, and means for applying to said electrode pairs potentials such that said beam is moved to establish said successive sets of potentials on successive rows of said elements only when said control potential is not applied to said input means and is moved to produce output pulses on such of said output members as are capacitatively coupled to secondary electron emissive elements charged to said relatively high potential only when said control potential is applied to said input means.

4. The combination of means for forming a beam of electrons, pairs of electrodes for controlling the position of said beam, a plurality of secondary electron emissive elements aligned in columns and rows, a plurality of input members extending transversely of said rows and having apertures at said elements, a plurality of output members extending transversely of said rows and capacitatively associated with said elements, input means operable to apply to said input members successive sets of potentials each of which potentials has a relatively high or a relatively low value, means for applying to said input means a control potential such that said input means is made to apply the same potential to all of said input members, means for applying to said electrode pairs potentials such that said beam is moved to establish said successive sets of potentials on successive rows of said elements only when said control potential is not applied to said input means and is moved to produce output pulses on such of said output members as are capacitatively coupled to secondary electron emissive elements charged to said relatively high potential only when said control potential is applied to said input means, and register means connected to said output members for registering said pulses.

5. The combination of means for forming a beam of electrons, pairs of electrodes for controlling the position of said beam, rows of secondary electron emissive elements, a plurality of input members extending transversely of said rows and having apertures at said elements, a plurality of output members extending transversely of said rows and capacitatively associated with said elements, input means operable to apply to said input members successive sets of potentials which are representative of successive values, means for applying to said input means a control potential such that the said input means is made to apply the same potential to all of said input members, a register connected to said output members, and means for applying to said electrode pairs potentials such that said beam is moved to establish said elements in successive sets of potentials on successive ones of said rows only when said control potential is not applied to said input means and is moved to establish said values in said register only when said control potential is applied to said input means.

6. The combination of means for forming a beam of electrons, pairs of electrodes for controlling the position of said beam, rows of secondary electron emissive elements, a plurality of input members extending transversely of said rows and having apertures at said elements, a plurality of output members extending transversely of said rows and capacitatively associated with said elements, input means operable to apply to said input members potentials which are representative of successive values, means operable to apply to said input means a control potential such that said input means is made to apply the same potential to all of said input members, register means connected to said output members, and means for applying to said electrode pairs potentials such that said beam is moved at one speed to establish said successive sets of potentials on successive rows of said elements only when said control potential is not applied to said input means and is moved at a different speed to establish said values in said register means only when said control potential is applied to said input means.

7. The combination of means for forming a beam of electrons, pairs of electrodes for controlling the position of said beam, rows of secondary electron emissive elements, a plurality of input members extending transversely of said rows and having apertures at said elements, a plurality of output members extending transversely of said rows and capacitatively associated with said elements, input means operable to apply to said input members successive sets of potentials which are representative of successive values, means for applying to said input means a control potential such that the said input means is made to apply the same potential to all of said input members, a register connected to said output members, means for applying to said electrode pairs potentials such that said beam is moved to establish said successive sets of potentials on elements in successive ones of said rows only when said control potential is not applied to said input means and is moved to establish said values in said register only when said control potential is applied to said input means, and timing means to initiate the inversion of the value in said register between the establishment of separate values therein.

8. The combination of means for forming a beam of electrons, pairs of electrodes for controlling the position of said beam, rows of secondary electron emissive elements, a plurality of input members extending transversely of said rows and having apertures at said elements, a plurality of output members extending transversely of said rows and capacitatively associated with said elements, input means operable to apply to said input members successive sets of potentials which are representative of successive values, means for applying to said input means a control potential such that the said input means is made to apply the same potential to all of said input members, a register connected to said output members, means for applying to said electrode pairs potentials such that said beam is moved to establish said successive sets of potentials on successive ones of said rows only when said control potential is not applied to said input means and is moved to establish said values in said register only when said control potential is applied to said input means, timing means and means responsive to said timing means to invert a value in said register after its establishment therein and to reinvert the value in said register after a second value has been established therein.

9. The combination of means for forming a beam of electrons, pairs of electrodes for controlling the position of said beam, rows of secondary electron emissive elements, a plurality of input members extending transversely of said rows and having apertures at said elements, a plurality of output members extending transversely of said rows and capacitatively associated with said elements, input means operable to apply to said input members successive sets of potentials which are representative of successive values, means for applying to said input means a control potential such that the said input means is made to apply the same potential to all of said input members, a register connected to said output members, means for applying to said electrode pairs potentials such that said beam is moved to establish said successive sets of potentials on successive ones of said rows only when said control potential is not applied to said input means and is moved to establish said values in said register only when said control potential is applied to said input means, timing means, means responsive to said timing means to invert a value in said register after its establishment therein, and to reinvert the value in said register after the establishment of a second value therein, and means responsive to said timing means to establish a zero value in said register after said reinversion.

10. The combination of a cathode ray tube having vertical and horizontal deflection plates for controlling the position of its ray and having a target wherein rows of secondary electron emissive elements are interposed between and insulated from input members and output members extending over said elements transversely of said rows, input means operable to apply to said input members potentials in successive sets which are representative of successive values, register means connected to said output members, means operable to apply a timing pulse, means operable in response to said timing pulse to apply to said vertical deflection plates potentials such that said ray is moved to successive rows of said elements, and means operable in response to said timing pulse to apply to said horizontal deflection plates potentials such that said ray is moved in one direction to establish said successive sets of potentials on successive rows of said elements.

11. The combination of a cathode ray tube having vertical and horizontal deflectors for controlling the position of its ray and having a target wherein rows of secondary electron emissive elements are interposed between and insulated from input members and output members extending over said elements transversely of said rows, input means operable to apply to said input members potentials in successive sets which are representative of successive values, register means connected to said output members, means operable to apply a timing pulse, means operable in response to said timing pulse to apply to said vertical deflectors potentials such that said ray is moved to successive rows of said elements, means operable in response to said timing pulse to apply to said horizontal deflectors potentials such that said ray is moved in one direction to establish said successive sets of potentials on successive rows of said elements and to provide an output pulse after establishing a set of potentials in a row, and means operable in response to said output pulse to apply to said input means a control potential such that said input means is made to apply the same potential to all of said input members and said values are established in said register means in response to movement of said ray in the opposite direction.

12. The combination of a cathode ray tube having vertical and horizontal deflection plates for controlling the position of its ray and having a target wherein rows of secondary electron emissive elements are interposed between and insulated from input members and output members extending over said elements transversely of said rows, input means operable to apply to said input members potentials in successive sets which are representative of successive values, register means connected to said output members, means operable to apply a timing pulse, means operable in response to said timing pulse to apply to said vertical deflection plates potentials such that said ray is moved to successive rows of said elements, means operable in response to said timing pulse to apply to said horizontal deflection plates potentials such that said ray is moved in one direction to establish said successive sets of potentials on successive rows of said elements and to provide a first output pulse after said ray has moved in said one direction and such that said ray is moved in the opposite direction to permit reading out of the potentials established in a row and to provide a second output pulse after said ray has moved in said opposite direction, means operable in response to said output pulse to apply to said input means a control potential such that said input means is made to apply the same potential to all of said input members and said values are established in said register means in response to movement of said ray in the opposite direction, and means operable in response to said second output pulse to invert the first of said established values in said register prior to the establishing of a second of said established values in said register.

13. The combination of a cathode ray tube having vertical and horizontal deflection plates for controlling the position of its ray and having a target wherein rows of secondary electron emissive elements are interposed between and insulated from input members and output members extending over said elements transversely of said rows, input means operable to apply to said input members potentials in successive sets which are representative of successive values, register means connected to said output members, means operable to apply a timing pulse, means operable in response to said timing pulse to apply to said vertical deflection plates potentials such that said ray is moved to successive rows of said elements, means operable in response to said timing pulse to generate timing pulses, means operable in response to said timing pulses to apply to said horizontal deflection plates potentials such that said ray is moved in one direction to establish said successive sets of potentials on successive rows of said elements, means operable in response to one of said timing pulses to apply to said input means a control potential such that said input means is made to apply the same potential to all of said input members and said values are established in said register means in response to movement of said ray in the opposite direction, and means operable in response to others of said timing pulses to invert the first of said established values in said register prior to the establishing of a second of said established values in said register and to invert the value in said register resulting from establishing said inverted value and said second established value.

14. The combination of a cathode ray tube having vertical and horizontal deflection plates for controlling the position of its ray and having a target wherein rows of secondary electron emissive elements are interposed between and insulated from input members and output members extending over said elements transversely of said rows, input means operable to apply to said input members potentials in successive sets which are representative of successive values, register means connected to said output members, means operable to apply a timing pulse, means operable in response to said timing pulse to apply to said vertical deflection plates potentials such that said ray is moved to successive rows of said elements, means operable in response to said timing pulse to generate timing pulses, means operable in response to said timing pulses to apply to said horizontal deflection plates potentials such that said ray is moved in one direction to establish said successive sets of potentials on successive rows of said elements, means operable in response to a first one of said timing pulses to apply to said input means a control potential such that said input means is made to apply the same potential to all of said input members and said values are established in said register means in response to movement of said ray in the opposite direction, means operable in response to a second one of said timing pulses to invert the first of said established values in said register prior to the establishing of the second of said established values and operable in response to a third one of said timing pulses to invert the value in said register resulting from said inverted value and said second established value, and means responsive to still another one of said timing pulses for establishing a zero value in said register means.

15. The combination of a cathode ray tube having vertical and horizontal deflection plates for controlling the position of its ray and having a target which includes separate groups of potential storing means each provided with an input and an output lead, input means operable to apply to said input leads successive sets of potentials which are representative of successive numbers, a register having input leads connected to the output leads of said target, and means for applying to said deflection plates potentials to move said ray to establish said successive sets of potentials in successive rows of said potential storage means and to move said ray to establish said numbers represented by said potentials in said register.

16. The combination of a cathode ray tube having vertical and horizontal deflection plates controlling the position of its ray and having a target which icludes separate groups of potential storing means each provided with an input and an output lead, input means operable to apply to said input leads successive sets of potentials which are representative of successive numbers, a register having input leads connected to the output leads of said target, means for applying to said vertical deflection plates a potential such that said ray is moved to select a horizontal row of said potential storage means, and means for applying to said horizontal deflection plates potentials such that said ray is moved in one direction to establish one said successive set of potentials on said selected horizontal row of said potential storage means and is moved in the opposite direction across said row, and means for applying to said input means a control potential to operate said input means to apply the same potential to all the input leads of said target to establish the number represented by the set of potentials established in said selected horizontal row of potential storage means in said register in response to movement of said ray in said opposite direction.

17. The combination of a cathode ray tube having vertical and horizontal deflection plates for controlling the position of its ray and having a target which includes separate groups of potential storing means each provided with an input and an output lead, input means operable to apply to said input leads successive sets of potentials which are representative of successive numbers, a register having input leads connected to the output leads of said target, means for applying to said vertical deflection plates potentials such that said ray is moved to select successive horizontal rows of said potential storage means, means for applying to said horizontal deflection plates potentials such that said ray is moved in one direction to establish said successive sets of potentials on successive horizontal rows of said potential storage means and is moved in the opposite direction to establish in said register the number represented by the set of potentials stored in said selected row of potential storage means, and means for applying to said input means a control potential to operate said input means to apply the same potential to all of said input leads to establish said number in said register.

GEORGE A. MORTON.
LESLIE E. FLORY.
RICHARD L. SNYDER, Jr.

References Cited in the file of this patent
UNITED STATES PATENTS

| Number | Name | Date |
|---|---|---|
| 2,157,048 | Zworykin | May 3, 1939 |
| 2,176,225 | Ogloblinsky | Oct. 17, 1939 |
| 2,445,215 | Flory | July 13, 1948 |
| 2,458,205 | Rose | Jan. 4, 1949 |